United States Patent
Baerg

[15] 3,688,911
[45] Sept. 5, 1972

[54] WATER TREATMENT APPARATUS

[72] Inventor: William Baerg, 1992 Lemnos Drive, Costa Mesa, Calif. 92626

[22] Filed: Dec. 20, 1968

[21] Appl. No.: 785,573

[52] U.S. Cl. ................................................210/321
[51] Int. Cl. ...........................................B01d 13/00
[58] Field of Search........210/104, 110, 321, 22, 418, 210/437; 138/30, 257

[56] References Cited

UNITED STATES PATENTS

| | | | |
|---|---|---|---|
| 3,457,170 | 7/1969 | Havens | 210/23 |
| 3,505,216 | 4/1970 | Kryzer | 210/23 |
| 3,060,119 | 10/1962 | Carpenter | 210/321 X |
| 3,400,825 | 9/1968 | Shippey | 210/321 |
| 3,442,389 | 5/1969 | Mendelson | 210/321 |
| 3,493,496 | 2/1970 | Bray et al | 210/321 X |
| 3,182,685 | 5/1965 | Mercier | 138/30 |

OTHER PUBLICATIONS

Saline Water Conversion Report, 1966, U.S. Office of Saline Water, 1967, pp. 126–127
Gulf General Atomic, centerfold pictures.

*Primary Examiner*—Reuben Friedman
*Assistant Examiner*—Richard Barnes
*Attorney*—Thomas H. Jones and Smyth, Roston & Pavitt

[57] ABSTRACT

This invention relates to improvements in methods of treating, storing and dispensing water and to improvements in systems for treating and storing and dispensing water. The method includes the steps of storing a quantity of treated water under near atmospheric pressure and adding to that quantity by forcing untreated water through a selected filter at higher pressure and by dispensing a portion of that quantity of treated water by increasing the pressure to substantially said higher pressure. An apparatus is described by which to treat, to store and to dispense water by that and other methods. The apparatus includes a composite container structure which defines three separate containers some of which share common walls. The container is associated with valving and fluid flow circuitry by which raw water is treated until a selected quantity of it has been stored and by which treated water may be dispensed at raw water pressure and at selected rate by operation of a single control.

9 Claims, 5 Drawing Figures

Patented Sept. 5, 1972
3,688,911
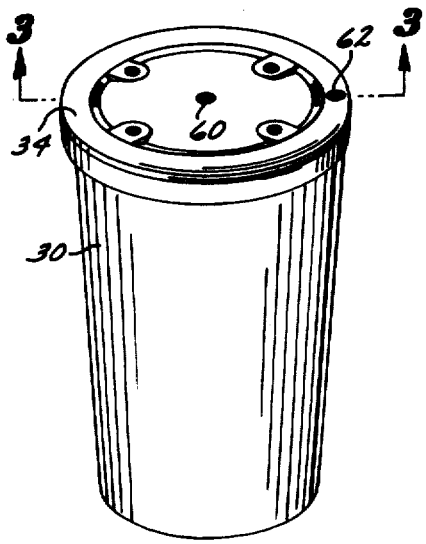
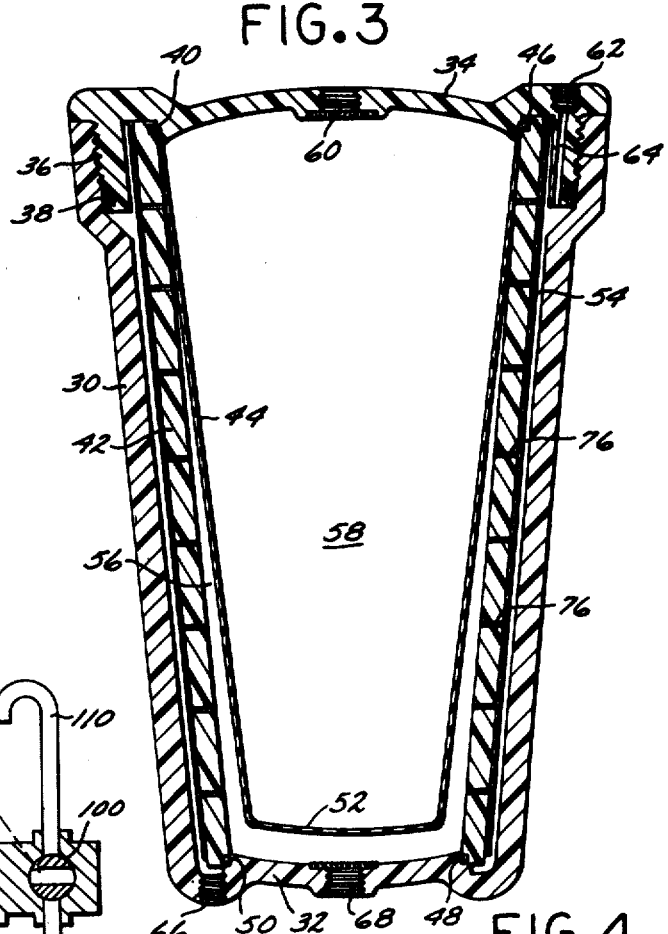
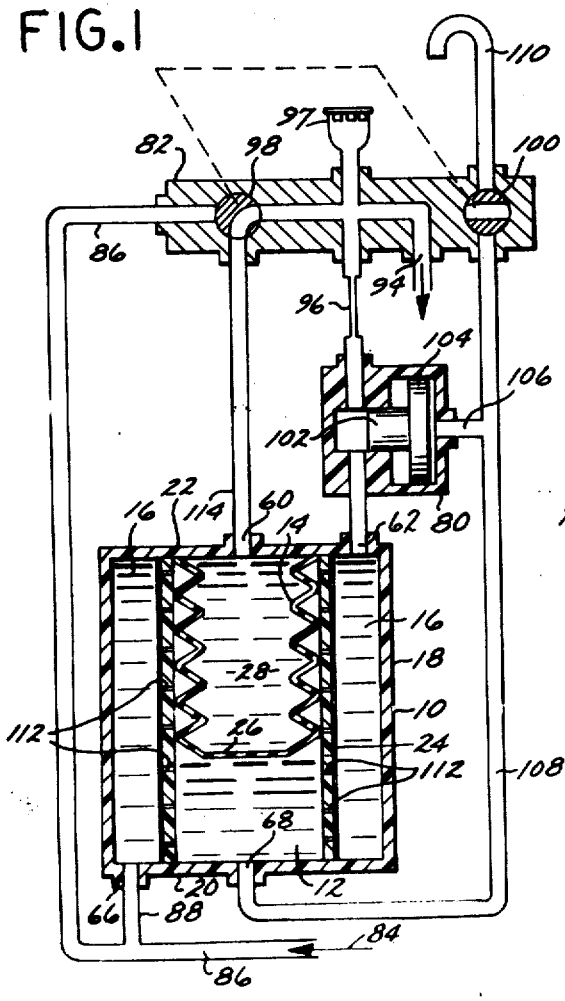
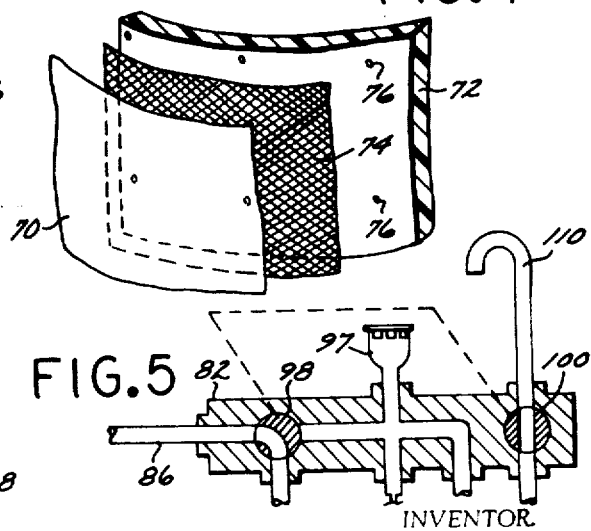
INVENTOR.
WILLIAM BAERG
BY
Nimow & Frater
ATTORNEYS

WATER TREATMENT APPARATUS

This invention relates to improvements in water treatment systems and to improved methods of treating water and storing and dispensing treated water.

One object of the invention is to provide an improved means by which the purity of water may be increased practically and relatively easily. Another object is to provide a novel means by which that method is advantageously, although not necessarily, practiced. Neither the method nor the means is limited to the purification of tap water or to production of purified water at the relatively low rate required for private consumption. Both the method and the means are applicable to large scale water purification and, in fact, to pure water production at any rate from a great rate to the smallest rate. Nonetheless, the invention is particularly well suited to the production of pure water from tap water at the rate needed to supply the needs of residential and smaller commercial users. Accordingly, those steps and that apparatus which are particularly suited to such small scale production of pure water are now considered to be the best mode that applicant has devised for practicing his invention and have been selected for detailed description herein and for illustration in the accompanying drawing.

It is an object of the invention to provide a means by which pure water can be produced from tap water readily and relatively inexpensively. It is an object of the invention to provide an apparatus which is sufficiently inexpensive, easy to install, dependable in operation and effective in producing pure water so that it can be installed as an appliance in residential structures.

Another object is to provide an apparatus requiring a minimum of service in that it has a reasonable longevity, in that it is readily produced in reliable form and in that its accessible portions are readily understood by homeowners and other users.

Another object of the invention is to provide an apparatus which can be installed in association with a residential or restaurant kitchen sink, although the invention is not limited to such an installation.

Certain of these and other objects and advantages of the invention are realized in part by the provision of a method the steps of which include: storing a quantity of treated water under a pressure near atmospheric pressure; adding to that quantity by forcing untreated water through a constituent selective flow path without substantially changing the pressure; and dispensing a portion of that quantity of treated water by increasing the pressure. Also, certain of these and other objects and advantages of the invention are realized by providing an apparatus which includes a container for treated water having a wall which is movable to alter the interior volume of the container; an outlet flow path for treated water which communicates with that container; a flow forcing means for forcing a selected volume of treated water from the container by utilizing a volume of material corresponding to the desired flow from the container to reduce the volume of the container.

In the drawings:

FIG. 1 is a schematic drawing of a water treatment system including apparatus for producing treated water, for storing it, and for dispensing it;

FIG. 2 is an isometric view of a form of water treatment apparatus advantageously employed in the system of FIG. 1;

FIG. 3 is a cross-sectional view of the treatment apparatus taken on line 3—3 of FIG. 2;

FIG. 4 is a fragmentary view of the elements which form one type of treatment apparatus useful in the invention and which is employed in the treatment apparatus illustrated in FIGS. 2 and 3; and FIG. 5 is a schematic view showing the valve structure of FIG. 1 in operating condition different from that depicted in FIG. 1.

Referring to FIG. 1 of the drawing, he apparatus there shown schematically is connected into a system of a type suitable for installation in residences or in other places where it is intended to produce small quantities of water for drinking and cooking to be available on demand simply by turning a faucet. The valve arrangement in the system shown and the utilization of inlet water pressure is such that this system operates from a single manual control which is actuated only when it is required to dispense treated water. The remainder of the system operation is automatic. Utility of the system is not limited to residential or restaurant installation and the particular system arrangement depicted is not the only arrangement of apparatus and hydraulic circuitry in which the invention may be embodied or with which the method of the invention may be practiced.

In FIG. 1, the numeral 10 generally designates a composite container structure having walls which define a container for treated water. The body of treated water is designated by the reference numeral 12. One wall of the container is movable. This wall is represented by the sylphon bellows structure 14. The bellows serves not only as a wall for the treated water container, but it also serves as one wall of another container for fluid, advantageously water, which is utilized in the dispensing of water from the body of treated water 12. The composite structure 10 further defines a container for a body of raw or untreated, input water, which body of water is here designated by the reference numeral 16. This container includes a wall 24 which is common to those container sections that house the body of treated water 12 and the body of untreated water 16. Advantageously, the water treatment structure has a cylindrical shape such that one of the containers is disposed within another which in turn is disposed within a third. The schematic structure 10 in FIG. 1 is intended to represent such a configuration. Numeral 18 designates a cylindrical outer container wall having a bottom 20 and a top 22. Inside the container thus formed a second cylindrical wall 24 extends from the upper wall 22 to the lower wall 20 whereby to define a container comprising the annular space about the inner wall 24 and within the outer wall 18. The sylphon bellows 14 is suspended from the upper wall 22 to which it is joined at the interior of the inner cylindrical wall 24. The upper end of the bellows 14 being closed by the upper wall 22 and the lower end of the bellows being closed by its own end wall 26, the space within the cylindrical wall 24 which is also within the sylphon bellows comprises a container separate from the container formed by the interior of the cylindrical wall 24 without the bellows. Thus it is that the composite structure 10 defines three containers, one intended to contain untreated water, another to contain treated or product water, and the third to contain a fluid, advantageously water, for the purpose of forcing a selected volume of treated water from the treated water container.

It is preferable, in a pure water appliance mounted upon a residential kitchen sink, that water be dispensed at substantially the same pressure at which untreated water is dispensed from the conventional tap. The system of FIG. 1 is arranged to do just that by utilizing the untreated tap water as the fluid which is used to dispense the treated water. The body of water 28 which is disposed within the sylphon bellows in FIG. 1 is tap water.

In the composite structure 10 there is a common wall between the body of untreated tap water which is to be treated and the body of treated water. This arrangement is necessary only when the common wall functions as part of the structure or element which accomplishes treatment as it does in this embodiment. Common wall 24 is arranged to treat the tap water as it is transported through the wall by a reverse osmosis process. This process and the structural arrangement depicted schematically in FIG. 1 are preferred. However, the invention can be practiced by utilizing other water treatment processes in which case the connection between the body of untreated water and the body of treated water need not include a common wall but is made through an apparatus effective to accomplish that alternative process.

The requirement for common walls between the several containers can be met in configurations other than that selected for illustration in the drawings. It will be readily apparent that is is not essential that the untreated water container surround the other two. Other arrangements will permit the required coordination between the several bodies of water and accordingly may be employed. However, the arrangement depicted provides several advantages. The amount of water that is treated by reverse osmosis is dependent upon several variables including: the area of the reverse osmosis membrane; the degree in which impurities are concentrated within the water to be treated; and the pressure differential across the reverse osmosis membrane. It is a feature of the invention, particularly in this system arrangement, that the reverse osmosis membrane may be laid flat upon a permeable supporting surface and need not be wound in a spiral or some other complex configuration. Adequate membrane area is presented in the simple flat arrangement. In the small composite container structure illustrated, maximum area for conducting the treatment process is provided if the reverse osmosis membrane is placed close to the outer wall and, of course, this arrangement is preferred. Further, the deleterious effect of salt concentration polarization can be overcome in part by confining to a narrow dimension the layer of untreated water which overlies the reverse osmosis membrane. These two factors, membrane area and concentration of salts, should be taken into account in the design of a composite container structure and it has been found in this connection that an arrangement in which the raw water container surrounds the other two containers is advantageous.

In the schematic drawing of FIG. 1, substantial spacing is shown between the treatment wall 24 and the outer wall 18 of the containers whereby a layer of substantial thickness of raw water overlies the reverse osmosis membrane which forms a part of wall 24. In practice, this space is advantageously relatively much smaller as it is shown to be in the composite container structure shown in cross-section in FIG. 3. The exterior of that composite container is illustrated in FIG. 2 where it is seen to be substantially symmetrical about a central axis and generally cylindrical although in this embodiment the walls are tapered inwardly toward the lower end of the container. Returning to FIG. 3, the outer container is designated by the reference numeral 30. It comprises walls of relatively uniform thickness. The side wall is generally cylindrical although tapered to slightly smaller diameter at its lower end. For identification, the lower wall of the outer container has been designated by the reference numeral 32. The cover 34 of the unit is separate. It is provided with threads that mate with threads at the upper end of outer container 30. In addition to the threaded connection at 36, an O-ring 38 is interposed between the two in a groove formed in one of them so that the container 30 will be sealed closed by cover 34. The lower surface of the cover 34 is provided with a conformation annular in form about the central axis of the cover and inwardly from the part that is threaded to the container 30. This conformation, which is designated by the reference numeral 40, accommodates the upper rim of a tapered cylinder 42 and it also accommodates the upper rim of a third open top container which is generally designated 44. In this embodiment, the container 44 is made of an elastomeric material molded to have an enlarged upper rim. The enlargement is generally circular in cross-section whereby it serves as an O-ring integrally formed with the container which, like the other container walls, is generally cylindrical except that it is tapered to a smaller diameter at its lower end. The enlarged rim portion of that inner container is designated by the numeral 46 and it is shown to be disposed within an anular groove formed on the inner surface at the upper end of the wall 42 of the intermediate container. This rim or O-ring portion 46 of the innermost container is pinched between the inner upper end of the wall 42 and the conformation 40 whereby it serves to seal against the passage of fluid from the outermost container to either of the inner two containers and to seal against the passage of fluid between the inner two containers. The the lower wall 32 of the outer container is formed with a conformation 48 at its upper surface at the inside of the container. This conformation is also annular in form about the central axis of the outer container and the lower end of the middle container wall 42 is seated against that shoulder like conformation 48. An O-ring 50, disposed in a notch in the lower inner surface of wall 42, seals against the passage of fluid between the outer and intermediate container past the lower end of wall 42. Wall 42 is a composite structure more fully depicted in FIG. 4, which will be described below. The side wall of the outer container 30 and the wall 42 are similarly tapered so that the spacing between the two is uniform throughout the length of the structure. The spacing is made relatively small. The inner container 44 has a closed lower end 52. In this embodiment its side walls are tapered more than those of the other two containers. This construction and configuration is not critical. It is necessary only that the treated water container, here the intermediate container, comprise a movable wall. That wall can be formed by the balloon or sack 44 in FIG. 3 or by a sylphon bellows structure such as the bellows 14 shown in FIG. 1, by a piston, or by a variety of other constructions.

To facilitate discussion, the space between the walls of the container 30 and the wall 42 is designated by the reference numeral 54. It is called the outer container or the raw water container for untreated water which is to flow through the reverse osmosis membrane which forms a part of wall 42. The space between wall 42 and the inner container wall 44 is designated 56 and is called the treated water container. It is the container in which water which has passed through the reverse osmosis membrane is stored. The space 58 at the interior of the inner container 44 holds water whose weight and pressure is used to force treated water from the intermediate space 56. The opening 60 centrally of the cover 34 permits the flow of water into, and out of, the space 58. Opening 62 in the cover 34, at the right in FIG. 3, communicates by a passage 64 with the interior of container 30 at a point outside the wall 42. Thus, opening 62 affords communication to the raw water space 54. Opening 66 at the lower end of container 30 also affords communication to the space 54. The opening 68 through the center of the lower wall 32 of container 30 affords communication to the intermediate space 56. It is through this opening 68 that treated water is withdrawn from the composite container.

Treated water enters the space 56 through the wall 42 and is treated in the process. In this embodiment, that treatment comprises permitting water to flow form the space 54 to the space 56 while precluding the flow of salts. This is accomplished by the reverse osmosis process through cellulose ascetate or other semi-permeable membrane. In osmosis through such a membrane, pure water permeates the membrane into a body of water on the opposite side of the membrane in which salts are dissolved whereby to reduce the concentration of such salts. In the reverse osmosis process, pure water is made to flow out of the concentrated solution through the membrane to the body of pure water. To accomplish reverse osmosis it is necessary only to pressurize the concentrated solution relative to the pure water body at the other side of the membrane. The amount of the flow is a function of pressure differential and it increases with that differential. During the process the salts tend to become concentrated in increasing degree toward the membrane surface. This concentration can be avoided if the untreated water can be made to flow with turbulence adjacent the membrane surface. In that case no special problem is presented. However, applicant's invention is applicable to systems in which the rate of production of treated water is relatively low whereby the flow of water in the raw water container, here space 54, is sufficiently low so that turbulence does not result as an incident to that flow. However, there are other ways to overcome the problem of salt concentration polarization. The degree of concentration at any distance from the treatment membrane varies directly with the velocity of flow through the membrane and inversely with the diffusion coeffecient of the salt, but that relationship tends to become invalid as the layer of water over the membrane is made thinner. When the layer is sufficiently thin, salt concentration tends to be uniform over the width of the layer. The effect of concentration polarization can be largely overcome by using a structure that confines the layer of water over the membrane to a fraction of an inch. Advantageously the raw water flow rate past the membrane is about equal to the rate of flow through the membrane, whereby half of the raw water input is turned into treated water and the other half of the input water is used to flush away the concentration salt solution.

The cellulose ascetate membrane must be continuous and intact. Even a pinhole would render it unusable. Because of this and the fact that the membrane is very thin, it is important that it be properly supported. A variety of supporting structures may be used, but applicant now prefers the supporting structure illustrated in FIGS. 3 and 4 of the drawing. As best shown in FIG. 4, the cellulose ascetate membrane 70 is supported by a strong, rigid structure 72 which is provided with a series of through openings by which water is permitted to flow. In this embodiment that member is made of a dense plastic material. The support structure is overlaid with a layer of material which will conduct water flow to the openings in the supporting structure from the entire inner surface of the membrane 70. Advantageously, that material, which is designated 74, comprises cloth. A shrink-resistant, open-weave, synthetic fibercloth is preferred. Nylon and dacron cloths are considered to be excellent for the purpose. The openings, some of which are designated by the reference numeral 76, may be quite small as shown. The cloth 74 is wound tightly over the surface of the support member 72 and the membrane 70 is wound tightly upon the surface of the cloth. To prevent the flow of water around the upper and lower edges of the membrane these edges are advantageously sealed with an impermeable tape, such, for example, as a silicone base adhesive tape.

Returning to FIG. 1, in addition to the composite container structure 10, the system includes a valve structure 80 at the center of the figure and another valve structure 82 at the top of the figure. The inlet for raw water is indicated by the arrow 84 which shows that the raw water enters a conduit 86 which connects by a branch 88 to the inlet port 66 of the raw water container of the composite container structure 10. Water leaves that container at the outlet port 62. It flows through the body of valve 80 and the body of valve 82 to a drain port 94. This flow path includes a restriction 96 which is a schematic representation of a means for limiting flow of raw water through the structure. The drain connection includes an air gap 97 whereby to preclude suction of drain water in the system. The valve structure 82 includes a two way valve 98 and a shutoff valve 100 which are operated simultaneously as indicated by the dash line interconnecting the valves. In FIG. 1, the valve 100 is closed and the valve 98 is arranged to preclude the flow of raw water through the valve from conduit 86.

Untreated water leaves the outlet port 62 through the valve 80 which is normally open as an incident to application of pressure against the piston 102 which constitutes the valve head. Piston 102 is connected to a piston of larger area designated by the reference numeral 104. The upper face of piston 104 is subjected to the pressure of the treated water by communication afforded through conduit 106 from the upper face of piston 104 to the treated water outlet port 68. Conduit 106 interconnects with conduit 108 which leads to the valve 100 and thence to an outlet faucet 110, but this line is shown closed by valve 100 in FIG. 1.

Untreated water passing through outlet 62 to valve 80 lifts the piston 102 to open the valve 80 thereby permitting the flow of water from the raw water container to the restriction 96 and thence to the drain. Thus, opening of valve 80 permits flow of raw water into the raw water container. Some water permeates the membrane which forms the outer surface of the wall and passes by openings in wall 24, some of which are designated by the reference numeral 112, to the interior of the wall 24, but outside the sylphon bellows 14. Thus water flows to the treated water container. The flow rate through the untreated water container is limited by the limiting means 96 so that approximately half of the inlet water is wasted to the drain at outlet 94 and the other half of the inlet water finds its way into the treated water container. As the treated water container fills, the pressure exerted through outlet 58 and conduit 106 upon the upper face of piston 104 is increased. When the treated water container is filled to a predetermine level, the force which it exerts upon piston 104 will be sufficient to overcome the force applied to the lesser area of piston 102 by the inlet water whereby the valve 80 will be closed. Accordingly, when a sufficient quantity of treated water is stored, the inlet water is shut off. If the supply is depleted below that predetermined level, the supply of inlet water will be automatically turned on.

The interior of the bellows 14 can be connected to the untreated water source by operation of the valve 98 in which case untreated water will flow through the conduit 86 and the valve 98 to conduit 114 which connects to inlet port 60. When water is permitted to flow into the sylphon bellows 14 the bellows will expand increasing its internal volume whereby a like volume of treated water will be forced through the outlet port 68 and by conduits 106 and 108 to the valve 100. Operation of valve 98 to permit the inflow of water into the bellows 14 also operates valve 100 to connect the line 108 to the faucet 110. Treated water will be dispensed from the faucet at the same pressure that inlet water is applied to the interior of the bellows 14. This condition of the valve structure 82 with its valves 98 and 100 is shown in FIG. 5.

Returning to FIG. 1, when valve 98 is in the position shown, the interior of the bellows 14 is connected by conduit 114 and valve 98 to the drain port 94. As inlet water permeates the membrane to the treated water container and fills the latter it will force the bellows 14 to collapse to smaller volume. As a part of this action, water contained in the bellows 14 is dispelled to the drain 94.

It will be apparent from this operation of the system that the control of the processing of raw water is entirely automatic, being controlled by the inlet line pressure and the operation of valve 80. The user need only operate the valves 100 or 98 to dispense treated water which is dispensed at the inlet line pressure. The system is arranged so that valves 98 and 100 can be operated simultaneously and hence can be operated by a single control. The experience of purveyors of treated water indicates that water treatment capacity of 2 gallons a day or less is entirely adequate for residential use. It will be apparent that a composite container structure to hold this quantity of treated water is sufficiently small to be installed as an appliance in a residential user's kitchen. The fact that the container can be separated from the control valve, being connected interconnected only by water conduits, further insures that an apparatus embodying the invention can be installed as an appliance as a part of a user's kitchen sink.

I claim:

1. A water treatment system comprising:
   a closed first container for purified water having a capacity which is at least adequate for residential use;
   a second container for raw water positioned at least substantially completely about said first container, said first and second containers having a water permeable wall in common, said water permeable wall including reverse osmosis means to remove impurities from water passing from said second container through said water permeable wall into said first container;
   pressure responsive means which is not the weight of purified water, connected with said first container;
   a valve having a first position that is open to atmospheric pressure and a second position in communication with a pressure source to actuate said pressure responsive means to pressurize purified water in said first container when said valve is moved to its second position, and an outlet in said first container.

2. The water treatment system of claim 1 wherein said first container is cylindrical and said second container is cylindrical and is concentrically mounted about said first container, said water permeable wall forming the outer surface of said first container and the inner surface of said second container.

3. The water treatment system of claim 1 including valve means to control the flow of raw water to said second container in response to the water level within said first container.

4. A water treatment system comprising:
   a closed container for purified water having a capacity which is at least adequate for residential use;
   a reverse osmosis unit having a passage for raw pressurized water and a passage for purified water with said passages being separated by a semipermeable membrane;
   said reverse osmosis unit and said container being in flow communication such that said container receives purified water from said reverse osmosis unit with the pressure within said container being the same as the pressure on the surface of the semipermeable membrane in contact with the purified water;
   said container having an outlet for dispensing purified water, and a first valve connected to said outlet;

pressure responsive means to change the volume of said container including a second valve having a first position which is open to the atmosphere to maintain said container under atmospheric pressure and a second position in communication with a pressure source to reduce the volume of said container, and control means interconnecting said first and second valves such that movement of said first valve to an open position moves said second valve to its second position and movement of said first valve to a closed position moves said second valve to its first position.

5. The water treatment system of claim 4 including a raw water input line to said reverse osmosis unit and a pressure line connecting said second valve to the raw water input line, whereby the movement of said second valve to its second position reduces the volume of said container by subjecting it to the pressure of the raw water.

6. The water treatment system of claim 5 including a valve in said raw water input line, and means to close and open said valve in response to the level of purified water within said container.

7. A water treatment system comprising:
   a closed first container for purified water;
   a second container for raw water positioned at least substantially completely about said first container;
   said first container having a movable interior wall;
   pressure response means to move said interior wall including a valve which in a first position is normally open to atmospheric pressure when said first container is receiving purified water from said second container and said valve having a second position in communication with a pressure source to move said movable wall to discharge purified water from said first container;
   and said first and second containers having a water permeable wall in common, said water permeable wall including reverse osmosis means to remove impurities from water passing from said second container through said water permeable wall into said first container.

8. The water treatment system of claim 7 including valve means to control the flow of raw water to said second container in response to the water level within said first container.

9. The water treatment system of claim 7 wherein said first container is cylindrical and said second container is cylindrical and is concentrically mounted about said first container, said water permeable wall forming the outer surface of said first container and the inner surface of said second container.

* * * * *